(12) United States Patent
Burckhardt et al.

(10) Patent No.: US 11,165,890 B2
(45) Date of Patent: *Nov. 2, 2021

(54) SECURE CLIENT-SERVER COMMUNICATION

(71) Applicant: International Business Machines Corporation, Armonk, NY (US)

(72) Inventors: Vincent Burckhardt, Clonee (IE); Carlos C. Manias Diez, Co. Dublin (IE); Olgierd Pieczul, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,915

(22) Filed: Jan. 23, 2020

(65) Prior Publication Data

US 2020/0162583 A1 May 21, 2020

Related U.S. Application Data

(63) Continuation of application No. 15/486,596, filed on Apr. 13, 2017, now Pat. No. 10,587,732.

(51) Int. Cl.
*H04L 29/06* (2006.01)
*H04W 4/02* (2018.01)

(52) U.S. Cl.
CPC .............. *H04L 67/42* (2013.01); *H04L 63/08* (2013.01); *H04L 63/0807* (2013.01);
(Continued)

(58) Field of Classification Search
CPC . H04L 67/42; H04L 63/1441; H04L 63/0807; H04L 63/126; H04L 63/08; H04W 4/02
See application file for complete search history.

(56) References Cited

U.S. PATENT DOCUMENTS 6,226,752 B1    5/2001    Gupta et al.
8,886,938 B1    11/2014    Greenwood
(Continued)

OTHER PUBLICATIONS

Abbott, Tom, "Where to Store Your JWTs—Cookies vs HTML5 Web Storage," https://stormpath.com/blog/wheretostore-your-jwts-cookies-vs-html5-web-storage, Jan. 8, 2016, pp. 1-8.
(Continued)

*Primary Examiner* — Carl G Colin
*Assistant Examiner* — Han Yang
(74) *Attorney, Agent, or Firm* — Winstead PC

(57) ABSTRACT

A secure client-server connection method compatible with RESTful (REpresentational State Transfer) APIs (Application Programming Interface) that is resistant to cross-site scripting (XSS) and cross-site request forgery (CSRF) attacks. The server generates a token for the client and a random value which it pairs with the token. The random value is hashed. The hash value is transmitted to the client contained in the token and the random value is transmitted to the client contained in an HTTPOnly cookie. Even if an attacker steals the token and/or the hash, security is maintained, since the server verifies communications from the client by validating the token on the basis of its hash value. Validation is performed by the server hashing the random value contained in the HTTPOnly cookie paired with the token to obtain a further hash value, and checking that this further hash value matches the token's hash value.

20 Claims, 5 Drawing Sheets

(52) U.S. Cl.
CPC ........ *H04L 63/126* (2013.01); *H04L 63/1441* (2013.01); *H04W 4/02* (2013.01)

(56) References Cited

U.S. PATENT DOCUMENTS

| | | | |
|---|---|---|---|
| 8,924,553 | B2 | 12/2014 | Schneider |
| 9,021,586 | B2 | 4/2015 | Garskof |
| 9,112,842 | B1 | 8/2015 | Gallagher, III |
| 10,587,732 | B2 * | 3/2020 | Burckhardt ......... H04L 63/0807 |
| 10,757,225 | B2 * | 8/2020 | Burckhardt ......... H04L 63/1441 |
| 2011/0055391 | A1 | 3/2011 | Schneider |
| 2012/0023377 | A1 | 1/2012 | Garskof |
| 2015/0341178 | A1 | 11/2015 | Tanaka et al. |
| 2016/0127352 | A1 | 5/2016 | Xu et al. |
| 2017/0338951 | A1 | 11/2017 | Fu et al. |
| 2017/0346804 | A1 | 11/2017 | Beecham |
| 2018/0262388 | A1 | 9/2018 | Johnson et al. |
| 2018/0278603 | A1 | 9/2018 | Yabe |

OTHER PUBLICATIONS

Angular, "/ API Reference / ng / service components in ng / $http," https://docs.angularjs.org/api/ng/service/$http#cross-site-requestforgery-xsrf-protection, 2016, pp. 1-10.

Stack Overflow, "Should JWT be Stored in LocalStorage or Cookie?" http://stackoverflow.com/questions/34817617/should-jwt-be-stored-in-localstorage-or-cookie, 2016, pp. 1-3.

Jeff Atwood, "Proecting Your Cookies," https://blog.codinghorror.com/protecting-your-cookies-httponly, 2018, pp. 1-7.

List of IBM Patents or Patent Applications Treated as Related, Jan. 30, 2020, pp. 1-2.

* cited by examiner

SECURE CLIENT-SERVER COMMUNICATION

TECHNICAL FIELD

The present invention relates generally to methods and apparatus for secure client-server communication, and more particularly to protecting client-side web authentication tokens from cross-site scripting attacks.

BACKGROUND

In modern cloud applications, it has become increasingly popular to separate a web client from server side processing. Web clients are often located in separate domains and reside fully client side without a server component. The client's relationship with the server is similar to that of other non-web clients such as a mobile phone client. In such a setup, the web client often makes explicit calls to a RESTful (REpresentational State Transfer) API (Application Programming Interface) provided by the service's back-end. The credential used for establishing security on the connection is often an access token created by the server, such as a JSON web token (JWT). A JWT can be stored at the client in client-side storage, e.g. in JavaScript LocalStore. A JWT is a client-side credential, i.e. one that is readable by the client, e.g. via a client-side API.

JSON is an open standard defined in RFC7519, RFC7515 and RFC7516. Of these standards, RFC7519 relates to creating JWTs. The JWT is signed by the server's key to enable a client to verify its authenticity. The purpose of a JWT is to allow secure communication between client and server. A simplified form of a JWT might be as follows:

```
{... header ..}
{
    "iss": "Some Service",
    "iat": 1478526974,
    "exp": 1510062974,
    "aud": "test",
    "sub": "johh.smith@example.com"
}
SIGNATURE
```

Storing a credential using local storage has a number of advantages. First, it allows better isolation of the client-side code from the server-side component. Second, it prevents a credential from being automatically sent when the client-side browser makes a server request. On the second point, a browser transmitting a credential is susceptible to a vulnerability exploited by cross-site request forgery (CSRF) attacks. For example, when accessing a CSRF attack link, a browser is stimulated automatically to send all existing cookies for that domain to the attacker. CSRF attacks thus exploit the trust that a website has in a user's browser.

However, storing a credential locally also has the disadvantage that the credential is vulnerable to cross-site scripting (XSS) attacks against the web client. An XSS attack enables attackers to inject scripts from a client into webpages viewed by other users. XSS attacks exploit the trust that a user has for a website, i.e., the opposite of a CSRF attack. Compared with traditional web applications, in modern applications using JWTs, the access tokens are long-lived and can be valid for a number of days or weeks, which increases the potential damage that can be caused by a single XSS attack, since the exposed tokens can be used long after the root XSS vulnerability has been fixed.

Traditional web applications use special HyperText Transfer Protocol (HTTP) cookies known as HTTPOnly cookies. An HTTPOnly cookie is a type of HTTP cookie which contains a server-side credential that, on an established client-server communication channel, is sent by the client to the server with every call. Giving a cookie an HTTPOnly attribute directs browsers not to reveal such a cookie other than in response to an HTTP request. In particular, an HTTPOnly cookie cannot be accessed by client-side APIs, such as JavaScript code. Consequently, an HTTPOnly cookie is immune from a normal XSS attack.

However, it is usually not possible to use HTTPOnly cookies to store session identifiers in modern applications, since a client-side API of the RESTful type requires a JWT token to be sent to the client through an authenticating HTTP header, but that is not possible, if the cookie is not accessible to the client-side code. In any case, using HTTPOnly cookies to handle authentication, would open up the server to CSRF attacks, so would require additional countermeasures to be adopted.

SUMMARY

In one embodiment of the present invention, a computer-method for establishing a secure communication channel with a client comprises receiving a request from the client to establish a secure communication channel, where the client request is a request for a server to issue an access token within an authorization protocol. The method further comprises receiving a client-side credential containing a hash code and a cookie containing a server-side credential from the client over the secure communication channel in response to establishing the secure communication channel, where the client-side credential is contained in an authorization header, and where the server-side credential is subjected to a one-way function to create the hash code. The method additionally comprises validating the access token. Furthermore, the method comprises triggering an authentication component to perform an additional check based on the cookie in response to the access token containing a hash value, where the additional check comprises checking if a cookie with a random value exists. Additionally, the method comprises reapplying the one-way function to the random value to obtain a new hash value in response to the cookie with the random value existing. In addition, the method comprises comparing the new hash value with the hash value received from the client. The method further comprises indicating the access token valid in response to the new hash value matching the hash value received from the client.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
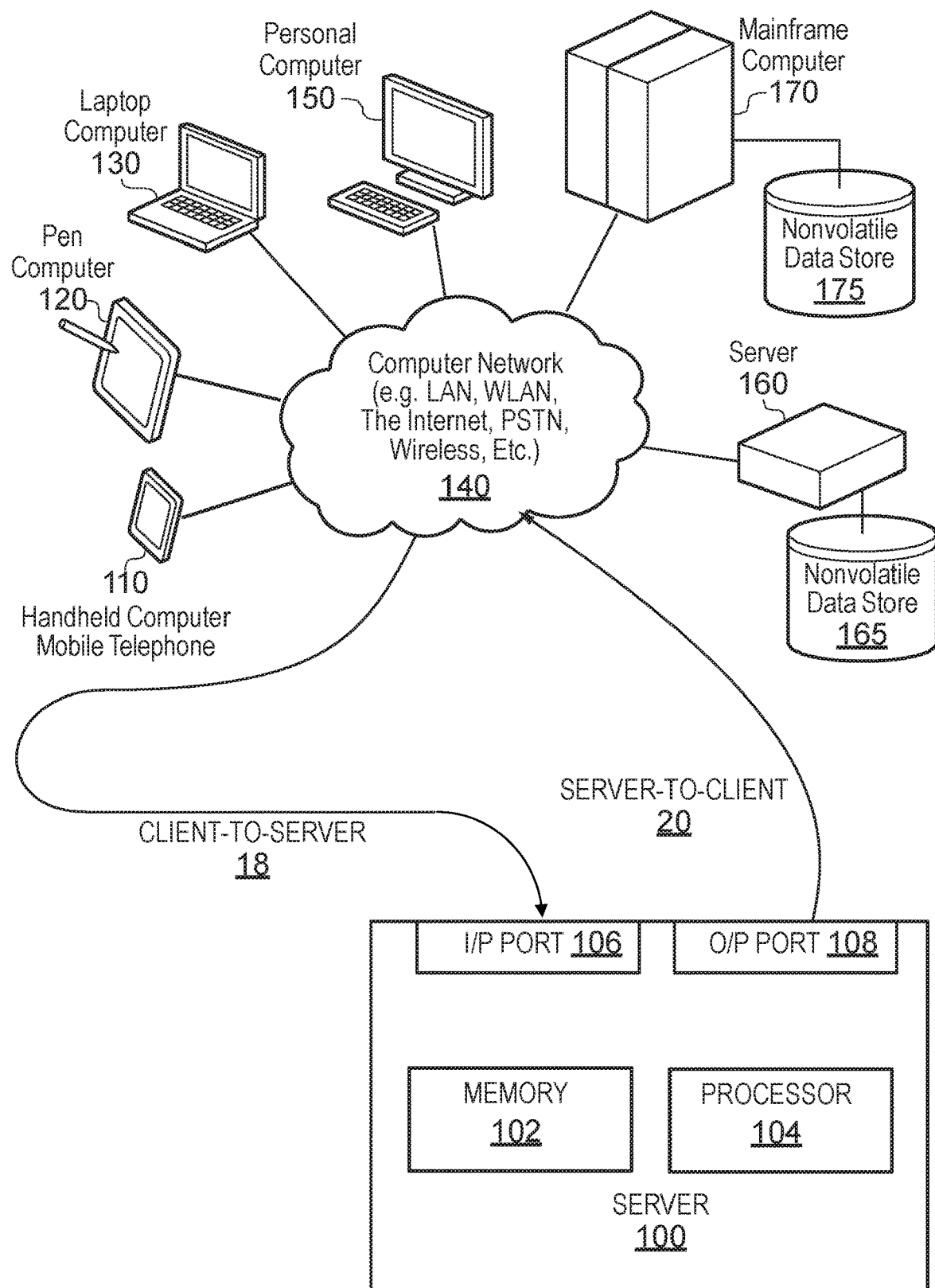
FIG. 1 depicts an exemplary computer network comprising a various computing devices capable of adopting client and server roles in a client-server communication paradigm in accordance with an embodiment of the present invention.

To solve the limitations discussed in the Background section, the present invention discloses a mechanism which, for each client-server connection, pairs a client-side credential, such as a JWT token, with a server-side credential, such as a random value, that cannot be accessed by the client. The pairing mechanism protects the client-side credentials (e.g., tokens) from being used when stolen as a result of XSS attack, while also not exposing the server-side APIs to CSRF attack. The security advantages of traditional web applications against XSS attacks are thus combined with the security advantages of modern, client-side located web clients against CSRF attacks.

According to one aspect of the disclosure, there is provided a client-server connection method performed by a server to establish a secure communication channel with a client, the method comprising:

receiving a request from a client to establish a secure communication channel;

generating a client-side credential;

generating a server-side credential and subjecting the server-side credential to a one-way function to create a hash code;

containing the server-side credential in a cookie of a type that cannot be accessed by the client;

containing the hash code in the client-side credential; and transmitting the client-side credential and the cookie to the client.

The cookie may be an HTTPOnly cookie.

In some embodiments, the server-side credential is a random value computed by a random value generator. In some embodiments, the client-side credential is a token, in which case the client request may be a request for the server to issue a token within the OAuth standard.

According to another aspect of the disclosure there is provided a computer program stored on a computer readable medium and loadable into the internal memory of a server, comprising software code portions, when said program is run on a server, for performing the client-server connection method. A computer program product may also be provided for storing the computer program.

According to another aspect of the disclosure, there is provided a client-server connection verification method performed by a server during secure communication with a client on an existing secure communication channel, the method comprising:

receiving from a client a client-side credential containing a hash code previously sent to the client as part of establishing the secure communication channel;

receiving from a client a server-side credential contained within a cookie of a type that cannot be accessed by the client, the cookie previously having been sent to the client as part of establishing the secure communication channel;

verifying that the hash code and server-side credential received from the client are mapped to each other by:

applying the same one-way function to the server-side credential that was used to calculate the hash code when the secure communication was established to generate a further hash code; and checking that the further hash code matches the hash code contained in the received client-side credential; and communicating with the client using said secure communication channel conditional on said verifying.

The cookie may be an HTTPOnly cookie. In some embodiments, the server-side credential is a random value computed by a random value generator. In some embodiments, the client-side credential is a token. In some embodiments, the client-side credential received from the client in received in an authorization header.

According to another aspect of the disclosure there is provided a computer program stored on a computer readable medium and loadable into the internal memory of a server, comprising software code portions, when said program is run on a server, for performing the client-server connection verification method. A computer program product may also be provided for storing the computer program.

According to a further aspect of the disclosure, there is provided a client-server connection method performed by a client to establish secure communication with a server, the method comprising:

transmitting a request to a server to establish a secure communication channel; and receiving in response from the server a client-side credential containing a hash code which has been created by the server applying a one-way function to a server-side credential generated for the secure communication channel and a cookie of the type that is inaccessible to the client in which is contained the server-side credential.

The cookie may be an HTTPOnly cookie. In some embodiments, the server-side credential is a random value computed by a random value generator. In some embodiments, the client-side credential is a token.

The client may use the secure communication channel by sending the client-side credential containing the hash code and the cookie containing the server-side credential back to the server. The client-side credential may be sent back to the server contained in an authorization header.

According to another aspect of the disclosure there is provided a computer program stored on a computer readable medium and loadable into the internal memory of a client, comprising software code portions, when said program is run on a client, for performing the client-server connection method. A computer program product may also be provided for storing the computer program.

According to still further aspects of the disclosure, there are provided computer programs stored on respective computer readable media and loadable into the internal memory of a client or server as appropriate, comprising software code portions, when said program is run on a client or server, for performing any of the above-recited methods.

According to still further aspects of the disclosure there are provided computer program products storing such computer programs.

Because the server-side credential cannot be accessed using client-side code, an attacker may not access it by attacking the client. Only the client-side credential, which may be contained in a token, is available to be read. The server-side credential can be contained in a cookie which serves as a convenient transport container for sending the server-side credential back and forth between server and client. An attacker may steal the token using an XSS attack, but since the token is only useable in conjunction with its paired cookie, which cannot be accessed with an XSS attack, the stolen token is useless to the attacker.

The client automatically sends the cookie with any request sent to the server, but on its own the cookie does not authenticate the request, because the client-side credential is not in the cookie. The token that would be accessible to the attacker in the event of a XSS attack contains a hash of the value stored in the cookie, this value being inaccessible to the attacker. However, the attacker cannot re-create the value in the cookie from the hash, since the hash was generated by a one-way function from a random value. The server-side credential thereby remains secure.

The proposed approach is simple to implement and does not significantly increase the complexity of the server.

There is also the advantage that it is possible to apply the proposed approach selectively on a client-by-client basis. That is, if the server receives a connection setup request from a client of a type known not to need protection against XSS attacks, such as a mobile client, then the server can establish the communication channel using only a client-side credential and not a server-side credential and associated hash. On the other hand, if an XSS attack is possible for the requesting client, then the communication channel is set up with the added protection of the server-side credential and associated hash. A server is typically aware of the type of the client that the credential is being issued for. So, for clients for which XSS is a potential problem, which are often also the clients that can handle cookies, that is web clients, the server may issue a JWT token with a hash and corresponding HTTPOnly cookie containing the random value from which the hash was generated. For clients that do not require the protection the server may issue a regular JWT token. Further, this allows the server component that verifies the token, which is often a different component from the one that issues the token, to be unaware of the type of the client and their capabilities. The token verification logic only needs to check if the JWT token contains the hash (in which case the corresponding cookie is required) or it does not (in which it is not). This makes the verification logic generic.

According to another aspect of the disclosure there is provided a server operable to establish a secure communication channel with a client, the server comprising:

an input port operable to receive a request from a client to establish a secure communication channel;

a processor operable to: generate a client-side credential and a server-side credential; subject the server-side credential to a one-way function to create a hash code; and contain the hash code in the client-side credential; and an output port operable to transmit the client-side credential and the cookie to the client.

According to another aspect of the disclosure there is provided a server operable to verify a client-server connection during secure communication with a client on an existing secure communication channel, the server comprising:

an input port operable to receive from a client: a client-side credential containing a hash code previously sent to the client as part of establishing the secure communication channel; and a server-side credential contained within a cookie of a type that cannot be accessed by the client, the cookie previously having been sent to the client as part of establishing the secure communication channel;

a processor operable to verify that the hash code and server-side credential received from the client are mapped to each other by:

applying the same one-way function to the server-side credential that was used to calculate the hash code when the secure communication was established to generate a further hash code; and checking that the further hash code matches the hash code contained in the received client-side credential; and an output port operable to communicate with the client using said secure communication channel conditional on the processor verification.

According to another aspect of the disclosure there is provided a client operable to establish secure communication with a server, the client comprising:

a processor operable to generate a request for a server to establish a secure communication channel;

an output port operable to transmit the request to a server; and an input port operable to receive in response from the server a client-side credential containing a hash code which has been created by the server applying a one-way function to a server-side credential generated for the secure communication channel and a cookie of the type that is inaccessible to the client in which is contained the server-side credential.

The client may further comprise: the input port, the processor and the output port in combination using the secure communication channel by sending the client-side credential containing the hash code and the cookie containing the server-side credential back to the server.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

A client according to embodiments of the present disclosure may be any suitable computing device; for example a mobile phone (smartphone), phablet, tablet, laptop computer, gaming console, personal computer, smart television or media player. The computing device may be a user equipment as defined by one or more telecommunications standards. The computing device may be portable, e.g. a handheld computing device, or fixed. It is further noted that the client device may be a physical or a virtual machine.

FIG. 1 depicts a schematic diagram of one illustrative embodiment of network including a server 100 and various computer devices 110, 120, 130, 150, 160, 170 capable of adopting the client role in a client-server communication relationship with the server 100. For example, a user may use a handheld computer mobile telephone (aka smartphone) 110, pen or tablet computer 120, laptop computer 130, personal computer 150, server 160 or mainframe computer 170 to interact with the server 100. The various computing devices connected to each other via a computer network 140. Some of the information processing systems may use separate nonvolatile data stores (e.g., server 160 utilizes nonvolatile data store 165, and mainframe computer 170 utilizes nonvolatile data store 175). Communicating over a client-server communication channel, there is a path 18 from client to server and a path 20 from server to client, where the paths 18 and 20 may be shared or different.

The server 100 includes or has access to a computing device comprising one or more processors and one or more memories, and potentially any other computing device elements generally known in the art including buses, storage devices, communication interfaces, and the like. The server is illustrated as having an input port 106 for receiving communication from other computing devices including those with which it may form a client-server communication channel, and an output port for transmitting communications to other computing devices including those with which it may form a client-server communication channel. In addition, the server 100 is illustrated as having a memory 102 and a processor 104, wherein the memory 102 is capable of having loaded into it and storing one or more computer programs comprising software code portions. The computer programs, or software code portions thereof, may be run by the processor 104 for performing the methods described herein on the server side. The computing devices (e.g., 110, 120, 130) are connected over the network 140 with each other, with the server 100 and with other network devices or components via one or more wired and/or wireless data communication links, where each communication link may comprise one or more of wires, routers, switches, transmitters, receivers, or the like. Other embodiments may be used with components, systems, sub-systems, and/or devices other than those that are depicted herein.

Types of information processing systems that can act as clients in client-server communication with server 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. The nonvolatile data store can be a component that is external to the various information processing systems or can be internal to one of the information processing systems. An illustrative example of client computer showing an exemplary processor and various components commonly accessed by the processor is shown in FIG. 2.

Figure 2:
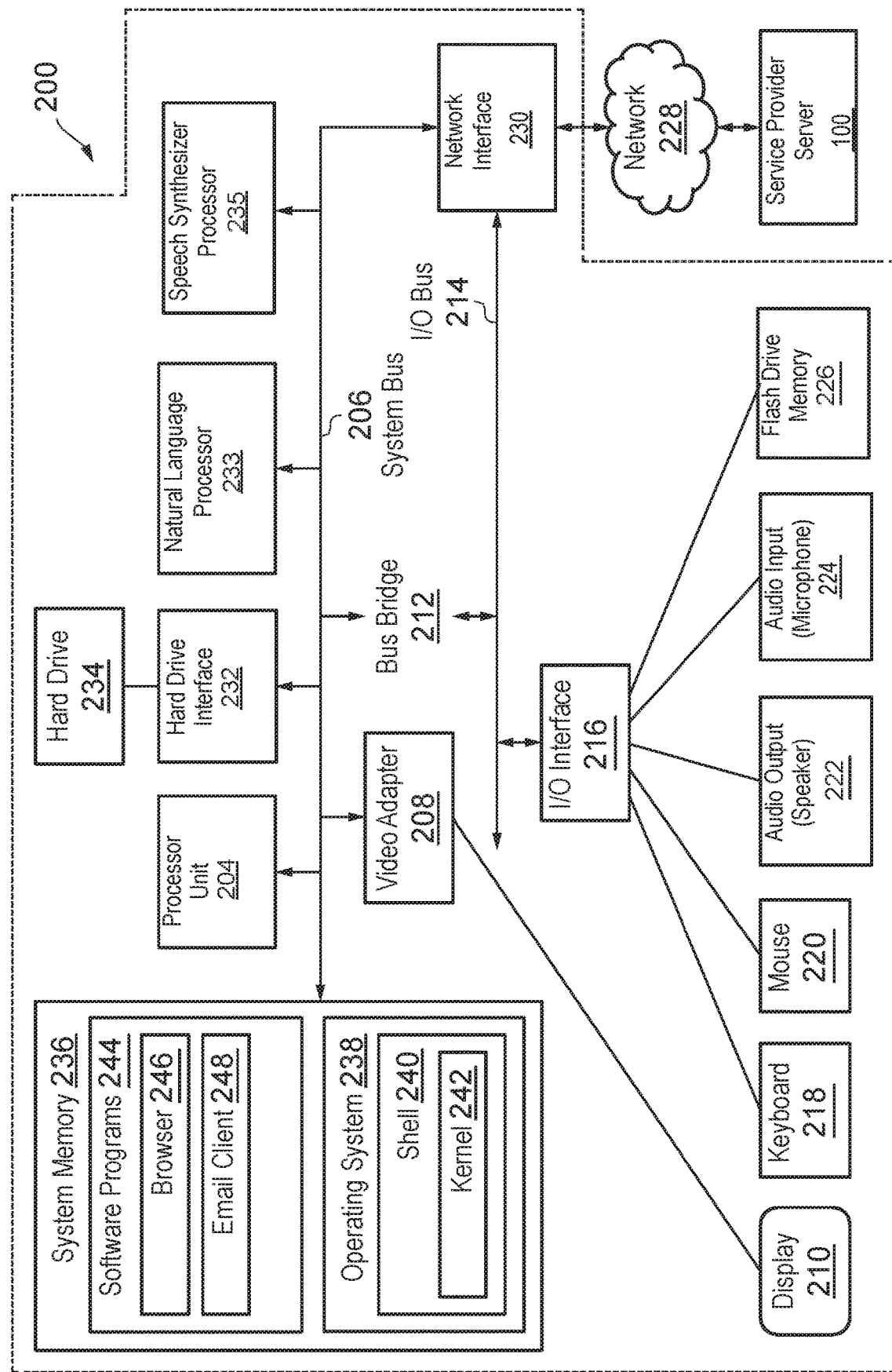
FIG. 2 is a simplified block diagram showing features of a client computing device in more detail in accordance with an embodiment of the present invention.

FIG. 2 is a simplified block diagram showing features of a client computing device 200 in more detail. Client computer 200 as illustrated is a simplified example of a client computer capable of performing the roles and functions described herein. Client computer 200 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, an audio input (microphone) 222 for speech input, an audio output 224 for speech output, and a flash drive memory 226. The format of the ports connected to I/O interface 216 may be any known to those skilled in the art of computer architecture, including but not limited to Universal Serial Bus (USB) ports.

The client computer 200 is able to communicate with a service provider server 100 via a network 228 using a network interface 230, which is coupled to system bus 206. Network 228 may be an external network such as the Internet, or an internal network such as an Ethernet Network or a Virtual Private Network (VPN). Using network 228, client computer 200 is able to access service provider server 100.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the client computer's 200 operating system (OS) 238 and software programs 244. Further processing capability may be provided in the form of a specialist natural language processor (NLP) 233 for converting speech input via audio input 222 to text. NLP 233 may be loaded with computer program that implements an automatic speech recognition (ASR) engine, for example. Still further processing capability may be provided by a speech synthesizer processor 235 for converting answers and other output data into speech for output via the audio output 224 or as an audio data file.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present disclosure can also support other user interface modes, such as graphical, voice, gestural, etc.

OS 238 also includes kernel 242, which includes lower levels of functionality for OS 238, including services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., client computer 200) to send and receive network messages to the Internet using HyperText Transfer Protocol (HTTP) messaging, thus enabling communication with service provider server 100.

The hardware elements depicted in the client computer 200 are not intended to be exhaustive, but rather are representative to highlight components used by the present disclosure. For instance, the client computer 200 may include alternate memory storage devices such as magnetic cassettes, Digital Versatile Disks (DVDs), Bernoulli cartridges, and the like.

In various embodiments, the network 228 may be a public network, such as the Internet, a physical private network, a virtual private network (VPN), or any combination thereof. In certain embodiments, the network 228 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on third, fourth or fifth generation (3G, 4G, 5G) wireless technologies including universal mobile telecommunications system (UMTS) and wideband code division multiple access (W-CDMA) and new radio (NR).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and 4G or 5G wireless technologies.

The message flow between a client and a server according to an embodiment is now described, wherein the dialogue has a first phase for establishing a secure communication channel between client and server, and a second phase of ongoing communication using the already-established secure communication channel.

From the server perspective, a secure communication channel with a client is established as follows. An authentication request containing user credentials is received at an input port of the server from a client. This is effectively a request by the client to establish a secure communication channel. In a concrete example, the client request can be a request for the server to issue a token within the OAuth authorization protocol, such as OAuth 1.0 (see RFC 5849) or OAuth 2.0 (see RFC 6749), where OAuth is an open standard for authenticating web clients to web servers. In response, the server uses its processing capability to generate a client-side credential such as an access token, e.g. JWT, and also a server-side credential. The server-side credential may for example be a random number or other variable, which is computed by or for the server using a random value generator. The server-side credential will thus be unique, or effectively unique, for the client-server channel being established. The server uses its processing capability to apply a one-way function to the server-side credential to create a hash code (sometimes called hash or hash value). The pairing made by the server between the client-side credential (e.g., token) and the client inaccessible-credential (e.g., random value) is thus only reproducible by the server which can reapply the one-way function to a random value and then check if the new hash value is the same as the old hash value. The server transmits an authentication response to the client, via an output port. The authentication response includes the client-side credential containing the hash code and the server-side credential, whereafter the client can use the secure communication channel. The server-side credential, e.g., a random value, is conveniently contained within a cookie of the type that cannot be accessed by the client, for example and HTTPOnly cookie, and it is the cookie that is transmitted to the client. The server functionality just described can be embodied in a computer program that can be distributed over a network to the server, for example.

From the client perspective, the same event, i.e., establishing a secure communication channel with a server is as follows. The client transmits a request to a server to establish a secure communication channel. The client then receives a response from the server. The response provides the client with a client-side credential, e.g., a token such as a JWT, which contains a hash code which has been created by the server as described above, wherein the random value or other server-side credential from which the hash code was created is received by the client in a cookie of the type that is inaccessible to the client, such as an HTTPOnly cookie. The client functionality just described can be embodied in a computer program that can be distributed over a network to the client, e.g., from the server.

Once established the secure communication channel can be used by the client sending authenticated requests to the server, such that the client sends the client-side credential (e.g., token) with the hash code back to the server, which enables the server to check the client's authenticity as follows. The server, on receipt of the cookie and the token, first validates the token. The server then checks if the token contains a hash value. If it does, this triggers an authentication component in the server to perform an additional check based on the cookie. This additional check involves the server checking if a cookie with the random value exists. If it does, then the server reapplies the one-way function to this random value to obtain a new hash value, and compares this new hash value with the hash value stored in the token received from the client. If the server-calculated new hash value matches the old hash value from the cookie, then the token is considered valid.

Here it is noted that the client-side credential can be sent back to the server contained in an authorization header.

During ongoing communication on an established channel, the server verifies the client authenticity (or the authenticity of the channel) from the client's authenticated requests by verifying that the hash code in the incoming token matches a server-calculated hash code calculated from the random value stored in the incoming HTTPOnly cookie that is paired with the token.

Acting on the client's requests and subsequent communication with the client over the communication channel in the form of authenticated responses is made conditional on successful verification.

It is noted that the server can decide whether to go through the process of generating the server-side credential and associated hash code each time it receives a client request to set up a new communication channel. If the server knows that the client is of a type that is not vulnerable to XSS attacks, such as a mobile client, the server may decide not to use a server-side credential for the requested channel, and instead use standard communication based on only a client-side credential, such as a JWT. In a particular example, the proposed approach allows a RESTful API server to continue using JWT tokens without the hash for clients. The authentication service provider server may thereby selectively send paired hash-containing tokens and HTTPOnly cookies containing server-side credentials to certain classes of client based on perceived need, e.g., vulnerability to XSS attacks, while not including them for other clients, e.g. mobile clients that are not vulnerable to XSS attacks. The selective approach may be based on client identifier, for example OAuth identifier of the requesting client.

Figure 3:
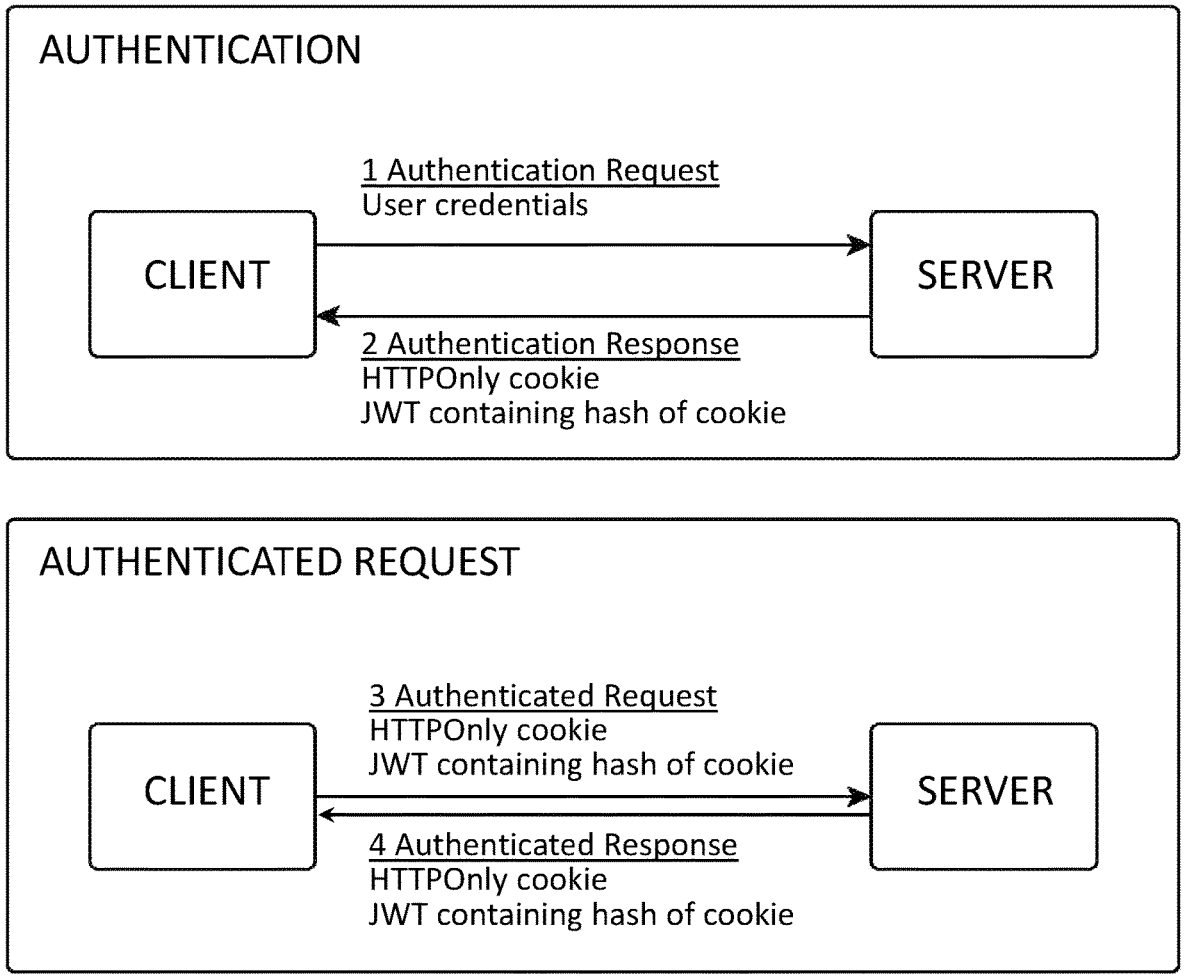
FIG. 3 shows messaging between a client and server in a worked example in accordance with an embodiment of the present invention.

A specific example is now described with reference to FIG. 3.

In a first message 1, the client sends an authentication request to the server containing its identifying information, i.e., user credentials.

In a second message 2, the server sends an authentication response to the client comprising a JWT containing the hash code in a message header and an HTTPOnly cookie containing the random value that the server has paired with the JWT.

In a third message 3, the client sends an authenticated request to the server on the now-established communication channel, where the authenticated request includes the JWT and the paired HTTPOnly cookie.

In a fourth message 4, the server responds to the client assuming that the JWT has been verified by the server based on re-creating the hash value from the random value, where the responses also include the JWT with the hash in the message header and the HTTPOnly cookie with the random value.

The JWT and HTTPOnly cookie are stored locally by the client.

The token differs from a conventional token in that it has an additional verifier field, so that, with reference to the simplified form of a JWT provided in the introduction, a simplified form of a JWT according to the present disclosure would be as follows:

```
{... header ..}
{
    "iss": "Some Service",
    "iat": 1478526974,
    "exp": 1510062974,
    "aud": "test",
    "sub": john.smith@example.com
    "verifier": "eee411109a229046154bc9d75265a9ccb23a3a9c"
}
SIGNATURE
```

The token is digitally signed according to the JWT standard specification and cannot be modified without invalidating the signature. When issuing the token, the server also issues an HTTPOnly, HTTP cookie as follows:

challenge=86f7e437faa5a7fce15d1ddcb9eaeaea377667b8

The relationship between the challenge in the cookie, i.e., the random value, and the verifier in the token is:

verifier=hash(challenge)

When processing the token, the server verifies that relationship using this function. The verification can be performed easily by the server, since it only involves re-computing the hash value from the random value by re-applying the same one-way function that was used when setting up the connection.

If the client-side storage is compromised, the token cannot be used as it is missing the cookie-stored challenge. Due to the one-way nature of the hash function, it is computationally infeasible to find a challenge that, if hashed, would match the verifier. It will be understood that the security depends on collision resistance of the hash function, and secure implementation of the hash process. Suitable approaches would be to use a message authentication code (MAC) otherwise known as a keyed cryptographic hash function; salt random data generation and/or expanded key functions.

It is also noted that, when the verifier is implemented in just a single field, as in the above example, the authentication service may renew the token without involving cookie operation. Consequently, all the logic related to token renewal does not have to be aware of the verification mechanism.

Alternatively, the random value and hash may be paired in another way that provides similar asymmetry. For example, the hash may be a hash of an entire token. However, other approaches may not provide equally good integration and flexibility, such as enabling verification only for certain clients or renewal without re-issuing the cookie.

It will be understood that embodiments of the present disclosure may be implemented using cloud computing. Specifically the server 100 and service provider server 100 may be hosted in the cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
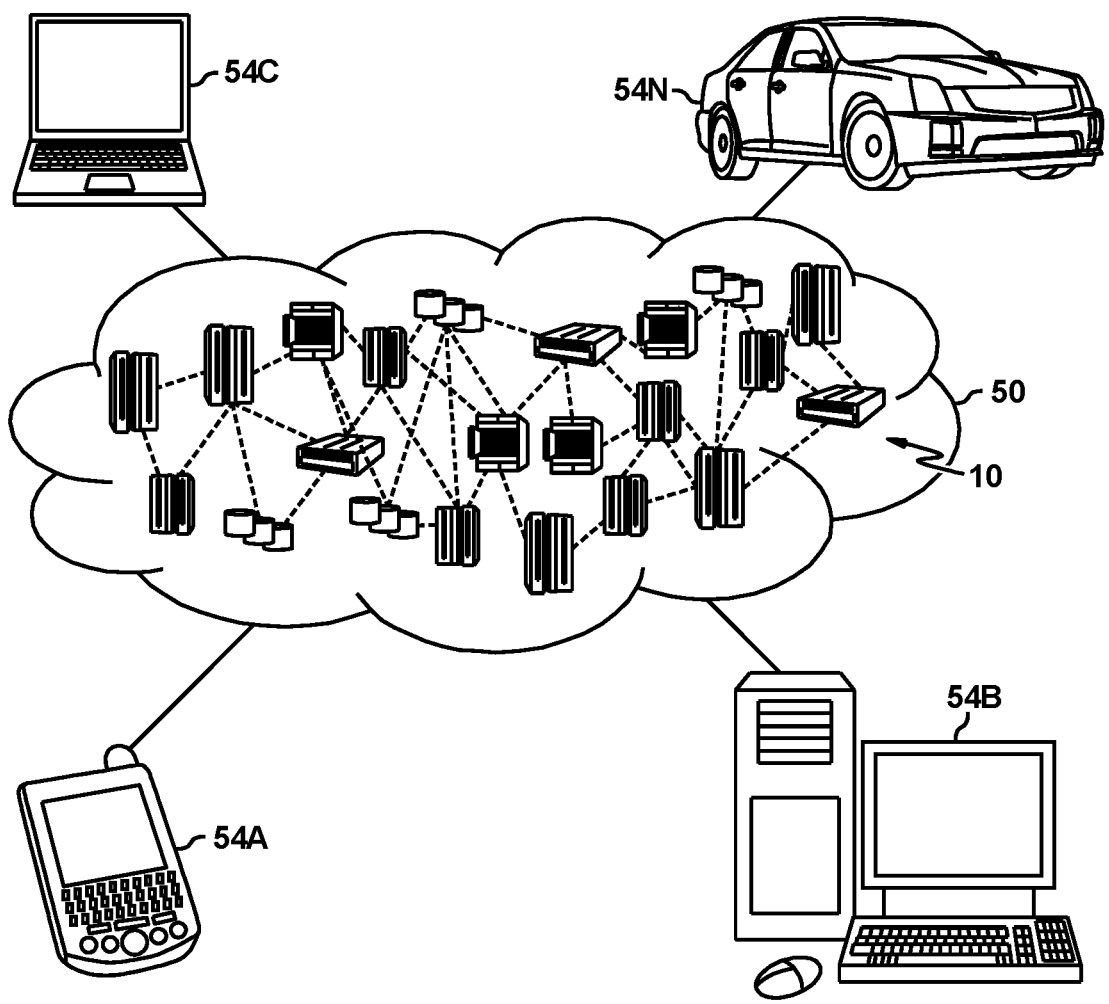
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes and cloud computing environment 50 can communicate with any type of computerized device over any type of network and/or network addressable connection (e.g., using a web browser).

In particular, it will be appreciated that any of the various computer devices 110, 120, 130, 150, 160, 170, and server 100 shown in FIG. 1, may correspond to said nodes and/or local computing devices 54A, 54B, 54C, 54N.

Figure 5:
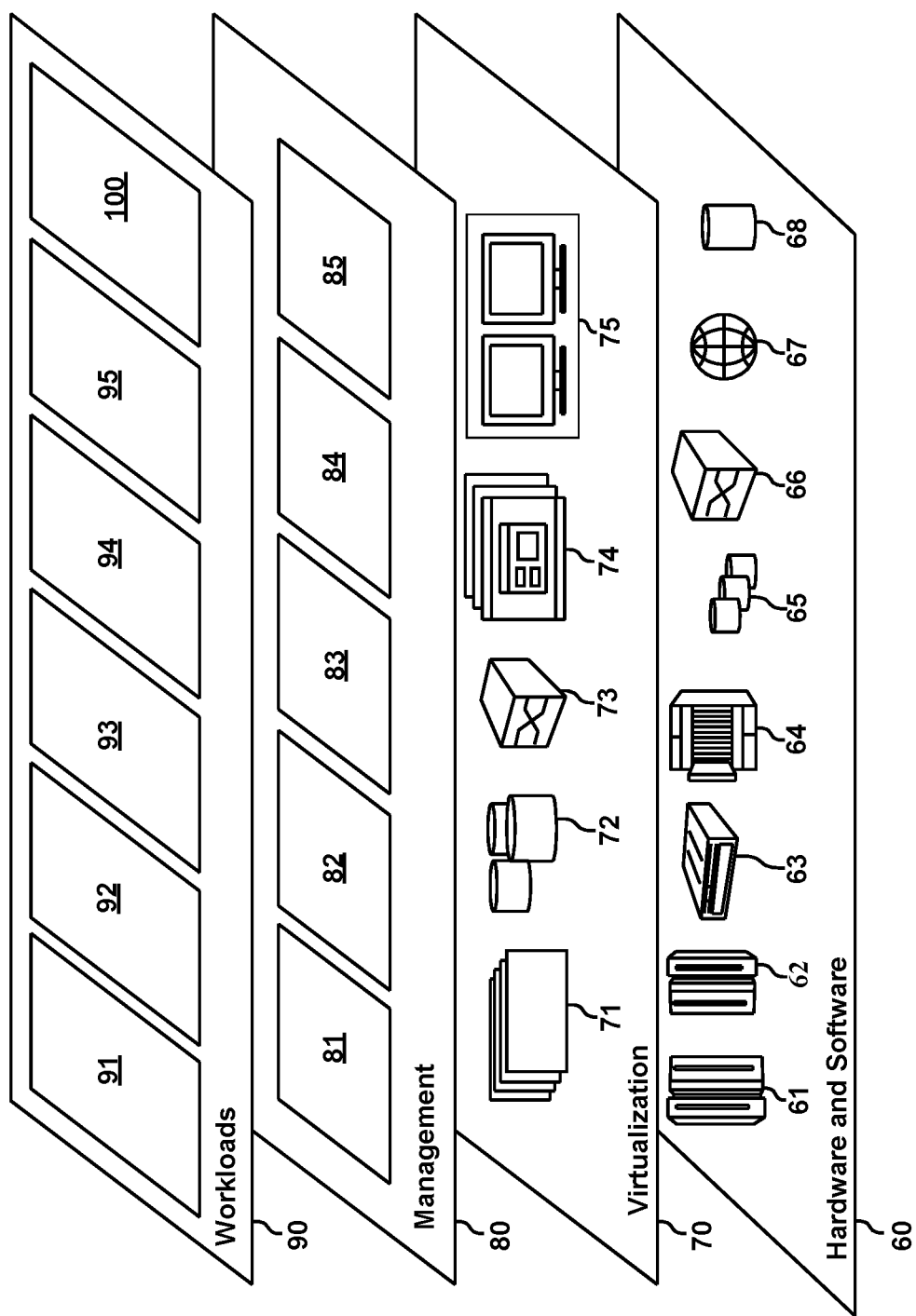
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

It will be appreciated that any of the various computer devices 110, 120, 130, 150, 160, 170, and server system 100 shown in FIG. 1, may correspond to physical or virtualized components in layers 60 and 70 respectively.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server 100.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present disclosure may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a client, a server, a computer system comprising client and server connected over a network, a method, and/or a computer program product. The computer program product may include a computer readable storage medium (or media) having computer readable program instructions thereon for causing a processor to carry out aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for establishing a secure communication channel with a client, the computer program product comprising one or more computer readable storage mediums having program code embodied therewith, the program code comprising the programming instructions for:
    receiving a request from the client to establish a secure communication channel, wherein the client request is a request for a server to issue an access token within an authorization protocol;
    receiving both a client-side credential containing a hash code and a cookie containing a server-side credential from the client over the secure communication channel in response to establishing the secure communication channel, wherein the client-side credential is contained in an authorization header, wherein the client-side credential comprises the access token, wherein the server-side credential is subjected to a one-way function to create the hash code;
    validating the access token;
    triggering an authentication component to perform an additional check based on the cookie in response to the access token containing a hash value, wherein the additional check comprises checking if the cookie contains a random value;
    reapplying the one-way function to the random value to obtain a new hash value in response to the cookie containing the random value;
    comparing the new hash value with the hash value received from the client; and
    indicating the access token valid in response to the new hash value matching the hash value received from the client.

2. The computer program product as recited in claim 1, wherein the program code further comprises the programming instructions for:
    generating the client-side credential in response to receiving the request from the client, wherein the client-side credential comprises the access token used for establishing security on the communication channel.

3. The computer program product as recited in claim 1, wherein the cookie is a cookie of a type that cannot be accessed by the client.

4. The computer program product as recited in claim 1, wherein the program code further comprises the programming instructions for:
    transmitting the client-side credential and the cookie to the client.

5. The computer program product as recited in claim 1, wherein the cookie is an HTTPOnly cookie.

6. The computer program product as recited in claim 1, wherein the server-side credential is the random value computed by a random value generator that cannot be accessed by the client.

7. The computer program product as recited in claim 1, wherein the access token comprises a JavaScript Object Notation (JSON) web token.

8. The computer program product as recited in claim 1, wherein the authorization protocol comprises an OAuth authorization protocol.

9. The computer program product as recited in claim 1, wherein the program code further comprises the programming instructions for:
    verifying an authenticity of the client by verifying that a hash code in an incoming token matches a server-calculated hash code calculated from a random value stored in an incoming cookie that is paired with the incoming token.

10. The computer program product as recited in claim 1, wherein the program code further comprises the programming instructions for:
    verifying an authenticity of the communication channel by verifying that a hash code in an incoming token matches a server-calculated hash code calculated from a random value stored in an incoming cookie that is paired with the incoming token.

11. A system, comprising:
    a memory for storing a computer program for establishing a secure communication channel with a client; and
    a processor connected to the memory, wherein the processor is configured to execute the program instructions of the computer program comprising:
        receiving a request from the client to establish a secure communication channel, wherein the client request is a request for a server to issue an access token within an authorization protocol;
        receiving both a client-side credential containing a hash code and a cookie containing a server-side credential from the client over the secure communication channel in response to establishing the secure communication channel, wherein the client-side credential is contained in an authorization header, wherein the client-side credential comprises the access token, wherein the server-side credential is subjected to a one-way function to create the hash code;
        validating the access token;
        triggering an authentication component to perform an additional check based on the cookie in response to the access token containing a hash value, wherein the additional check comprises checking if the cookie contains a random value;
        reapplying the one-way function to the random value to obtain a new hash value in response to the cookie containing the random value;
        comparing the new hash value with the hash value received from the client; and indicating the access token valid in response to the new hash value matching the hash value received from the client.

12. The system as recited in claim 11, wherein the program instructions of the computer program further comprise:

generating the client-side credential in response to receiving the request from the client, wherein the client-side credential comprises the access token used for establishing security on the communication channel.

13. The system as recited in claim 11, wherein the cookie is a cookie of a type that cannot be accessed by the client.

14. The system as recited in claim 11, wherein the program instructions of the computer program further comprise:

transmitting the client-side credential and the cookie to the client.

15. The system as recited in claim 11, wherein the cookie is an HTTPOnly cookie.

16. The system as recited in claim 11, wherein the server-side credential is the random value computed by a random value generator that cannot be accessed by the client.

17. The system as recited in claim 11, wherein the access token comprises a JavaScript Object Notation (JSON) web token.

18. The system as recited in claim 11, wherein the authorization protocol comprises an OAuth authorization protocol.

19. The system as recited in claim 11, wherein the program instructions of the computer program further comprise:

verifying an authenticity of the client by verifying that a hash code in an incoming token matches a server-calculated hash code calculated from a random value stored in an incoming cookie that is paired with the incoming token.

20. The system as recited in claim 11, wherein the program instructions of the computer program further comprise:

verifying an authenticity of the communication channel by verifying that a hash code in an incoming token matches a server-calculated hash code calculated from a random value stored in an incoming cookie that is paired with the incoming token.

\* \* \* \* \*